(12) United States Patent
Li

(10) Patent No.: US 10,018,873 B2
(45) Date of Patent: Jul. 10, 2018

(54) DISPLAY SUBSTRATE, DISPLAY PANEL, AND DISPLAY DEVICE HAVING A FULL COLOR GAMUT, ABSENT A COLOR FILTER, AND USING INFRARED LIGHT AND UP-CONVERSION MATERIAL

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/136,155

(22) Filed: Apr. 22, 2016

(65) Prior Publication Data

US 2016/0356455 A1    Dec. 8, 2016

(30) Foreign Application Priority Data

Jun. 3, 2015   (CN) .......................... 2015 1 0299959

(51) Int. Cl.
*H01L 27/32*      (2006.01)
*G02B 1/14*       (2015.01)
*G02F 1/1335*     (2006.01)

(52) U.S. Cl.
CPC ...... *G02F 1/133617* (2013.01); *G02F 1/1335* (2013.01); *G02F 2001/133614* (2013.01); *G02F 2203/11* (2013.01)

(58) Field of Classification Search
CPC ............. G02F 1/133617; G02F 1/1335; G02F 2203/11; G02F 2001/133614
See application file for complete search history.

(56) References Cited

U.S. PATENT DOCUMENTS

| | | | | |
|---|---|---|---|---|
| 6,275,205 B1* | 8/2001 | Winer | .................... | G09G 3/32 345/82 |
| 7,804,640 B1* | 9/2010 | Bass | .................... | G02B 27/017 257/59 |
| 8,576,479 B2* | 11/2013 | Dam | .................... | G02B 5/1876 359/326 |

(Continued)

FOREIGN PATENT DOCUMENTS

| CN | 101673488 A | 3/2010 |
|---|---|---|
| CN | 103472513 A | 12/2013 |

(Continued)

OTHER PUBLICATIONS

CAO, Chinese Patent Application 101673488, Mar. 2010, machine translation.*

(Continued)

*Primary Examiner* — Tracie Y Green
(74) *Attorney, Agent, or Firm* — Nath, Goldberg & Meyer; Joshua B. Goldberg

(57) ABSTRACT

The present invention provides a display substrate, a display panel and a display device. Said display substrate comprises multiple kinds of light-emitting units, each of which is made of an up-conversion material, and is used for emitting light with a corresponding color when a light irradiates on it. The display substrate above can reduce cost, display a wider color gamut and a higher color saturation, and can achieve higher light utilization efficiency, thereby can reduce power consumption, and furthermore, can reduce or avoid light leakage.

8 Claims, 2 Drawing Sheets

(56) References Cited

U.S. PATENT DOCUMENTS

| | | | |
|---|---|---|---|
| 9,182,631 B2 | 11/2015 | Iwata et al. | |
| 9,267,664 B2 | 2/2016 | Chen et al. | |
| 2008/0258079 A1* | 10/2008 | Bratkovski | ............ B82Y 20/00 |
| | | | 250/486.1 |
| 2016/0003448 A1 | 1/2016 | Dong et al. | |

FOREIGN PATENT DOCUMENTS

| | | | |
|---|---|---|---|
| CN | 103733243 A | 4/2014 |
| CN | 203895462 U | 10/2014 |
| TW | 201427893 A | 7/2014 |

OTHER PUBLICATIONS

First Office Action dated May 2, 2017 in corresponding Chinese Patent Application No. 201510299959.4.

\* cited by examiner

DISPLAY SUBSTRATE, DISPLAY PANEL, AND DISPLAY DEVICE HAVING A FULL COLOR GAMUT, ABSENT A COLOR FILTER, AND USING INFRARED LIGHT AND UP-CONVERSION MATERIAL

TECHNICAL FIELD

The present invention relates to the technical field of display, and particularly, to a display substrate, a display panel and a display device.

BACKGROUND ART

Thin Film Transistor Liquid Crystal Display (hereafter referred to as TFT-LCD) mainly comprises backlight and a display panel, wherein the backlight emits light, and the display panel achieves displaying by adjusting the transmittance of the light in the display panel according to the light emitted by the backlight.

The display panel usually comprises an array substrate and a color filter substrate, and a liquid crystal layer disposed between the array substrate and the color filter substrate. Generally, the array substrate comprises thereon devices such as thin film transistor, pixel electrode, and the color filter substrate comprises thereon devices such as color filter, common electrode. An electric field generated between the pixel electrode and the common electrode causes liquid crystal molecules deflection to adjust the transmittance of the light in the display panel, that is, to adjust the display brightness. The color filter is used to make each sub-pixel display a specific color (generally, sub-pixel displays red, green or blue respectively in TFT-LCD), thereby each pixel unit can display a corresponding color, and the TFT-LCD can achieve color display.

In above TFT-LCD, the main material for preparing the color filter is resin sheet which has higher production cost. Meanwhile, the color filter absorbs light whose color is different, causing a lower transmittance of the light in the resin sheet. Thus, the light utilization efficiency of TFT-LCD is low, causing lower display brightness, or higher power consumption of TFT-LCD. In addition, in the above existing TFT-LCD, the light comes from the backlight, so TFT-LCD display has smaller color gamut and color saturation, and easily leads to light leakage.

SUMMARY OF INVENTION

The present invention aims to solving at least one of the existing technical problems in the prior art, and providing a display substrate, a display panel and a display device, which can reduce cost, improve light utilization efficiency, thereby power consumption can be reduced, and light leakage can be reduced or avoided at the same time.

To achieve the object of the present invention, a display substrate is provided, which comprises multiple kinds of light-emitting units, each of which is made of an up-conversion material, and is used for emitting light with a corresponding color when a light irradiates on it.

Wherein, said light is infrared light.

Wherein, there are three kinds of light-emitting units: a light-emitting unit emitting red light, a light-emitting unit emitting green light, and a light-emitting unit emitting blue light.

Wherein, said light-emitting unit emitting red light comprises nanoparticles formed by a first up-conversion material, said first up-conversion material is formed by sintering, wherein NaF is adopted as matrix, $Y^{3+}$, $Yb^{3+}$, and $Ce^{3+}$ are doped, and glutamic acid is used as a sintering agent.

Wherein, said light-emitting unit emitting green light comprises nanoparticles formed by a second up-conversion material, said second up-conversion material is formed by sintering, wherein NaF is adopted as matrix, $Y^{3+}$, $Yb^{3+}$, and $Ho^{3+}$ are doped, and citric acid is used as a sintering agent.

Wherein, said light-emitting unit emitting blue light comprises nanoparticles formed by a third up-conversion material, said third up-conversion material is formed by sintering, wherein NaF is adopted as matrix, $Y^{3+}$, $Yb^{3+}$, and $Tm^{3+}$ are doped, and urea is used as a sintering agent.

Wherein, said display substrate further comprises:

a base substrate, on which said light-emitting units are formed;

a black matrix, which is formed on said base substrate, and separates said light-emitting units from each other;

a protective layer, which is formed on said light-emitting units.

As another technical solution, the present invention further provides a display panel, which comprises the display substrate above provided by the present invention.

As another technical solution, the present invention further provides a display device, which comprises the display panel above provided by the present invention.

Wherein, said display device comprises backlight, which emits light towards the light-emitting units, such that the light irradiates on the light-emitting units and the light-emitting units emit light with corresponding colors.

Wherein, said backlight includes an infrared light source.

The present invention has the following advantages:

The display substrate provided by the present invention comprises light-emitting units made of a up-conversion material, and does not need color filters because color display can be achieved by the light-emitting units. Compared to the existing technical solution which achieves color display by color filters, the preparation cost of the display substrate provided by the present invention is lower. Furthermore, since the color display is achieved by self-luminescence, the display substrate displays a wider color gamut and a higher color saturation. Since it does not need color filters to filter light, the light utilization efficiency is higher, thereby power consumption can be reduced. Furthermore, light leakage can be reduced or avoided, too.

The display panel provided by the present invention adopts the above display substrate provided by the present invention, so it can reduce cost, display a wider color gamut and a higher color saturation, and can achieve higher light utilization efficiency, thereby can reduce power consumption, and furthermore, can reduce or avoid light leakage.

The display device provided by the present invention adopts the above display panel provided by the present invention, so it can reduce cost, display a wider color gamut and a higher color saturation, and can achieve higher light utilization efficiency, thereby can reduce power consumption, and furthermore, can reduce or avoid light leakage.

DESCRIPTION OF THE DRAWINGS

The drawings are used for further understanding the present invention, constituting a part of Specification, and explaining the present invention together with the following embodiments, but they do not limit the scope of the present invention. In the drawings.

wherein, reference signs are: 1, display substrate; 2, array substrate; 3, liquid crystal layer; 10, 10a, 10b, 10c, light-emitting unit; 11, base substrate; 12, black matrix; 13, protective layer; 40, backlight; 41, light source; 42, light guide plate; 51, red light; 52, green light; 53, blue light; 60, light irradiating on light-emitting units.

DESCRIPTION OF EMBODIMENTS

Hereafter, embodiments of the present invention will be described in detail with reference to the accompanying figures. It should be understood that, the embodiments described here is used for illustrating and explaining the present invention only, and not intended to limit the present invention.

Figure 1:
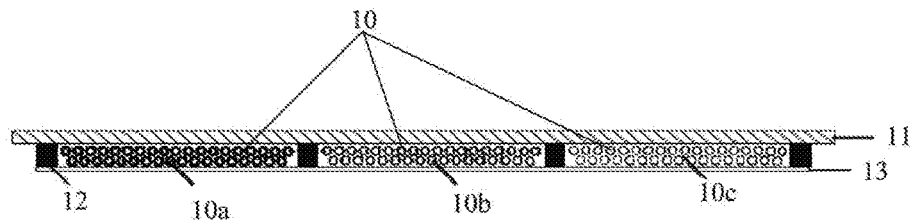
FIG. 1 is a schematic diagram of the display substrate provided in an embodiment of the present invention.

The present invention provides an embodiment of a display substrate. FIG. 1 is a schematic diagram of the display substrate provided in the embodiment of the present invention. As shown in FIG. 1, in this embodiment, said display substrate 1 comprises multiple kinds of light-emitting units 10, each of which is made of an up-conversion material, and is used for emitting light with a corresponding color when a light irradiates on it.

Particularly, the light irradiating on the up-conversion material is preferably infrared light with a wavelength of 800 nm~1500 nm.

The up-conversion material is a luminescent material having anti-Stokes effect. The up-conversion material can emit light when it is excited by a light with a first wavelength, and the wavelength of the light emitted is shorter than the first wavelength. In this embodiment, the up-conversion material is adopted to prepare the light-emitting unit 10 so as to achieve color display, so it does not need color filters.

Compared to the existing technical solution which achieves color display by color filters, firstly, the preparation cost of the display substrate provided by the present invention is lower; secondly, the light-emitting units 10 are self-luminous without filtering by a filter, the display substrate of this embodiment of the present invention displays a wider color gamut and a higher color saturation; thirdly, the light-emitting unit 10 is self-luminous, namely, the light achieves display is emitted from the surface thereof, rather than from the backlight, thereby light leakage can be reduced or avoided; fourthly, the color filter is removed, so less light is filtered, the light utilization efficiency is higher, thereby the power consumption can be reduced.

Generally, as shown in FIG. 1, there are three kinds of light-emitting units: a light-emitting unit 10a emitting red light, a light-emitting unit 10b emitting green light, and a light-emitting unit 10c emitting blue light. The color display of full chromatography can be achieved by mixing red light, green light and blue light in different proportions.

Figure 2:
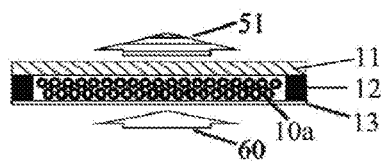
FIG. 2 is a schematic diagram of the light-emitting unit emitting red light.

Specifically, the light-emitting unit 10a emitting red light comprises nanoparticles formed by a first up-conversion material, said first up-conversion material is formed by sintering, wherein NaF is adopted as matrix, $Y^{3+}$, $Yb^{3+}$, and $Ce^{3+}$ are doped, and glutamic acid is used as a sintering agent. As shown in FIG. 2, the light-emitting unit 10a emits red light 51 (wavelength: about 620 nm~770 nm) when it is excited by light 60 irradiating on it.

Figure 3:
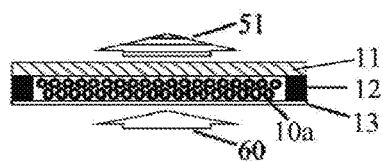
FIG. 3 is a schematic diagram of the light-emitting unit emitting green light.

The light-emitting unit 10b emitting green light comprises nanoparticles formed by a second up-conversion material, said second up-conversion material is formed by sintering, wherein NaF is adopted as matrix, $Y^{3+}$, $Yb^{3+}$, and $Ho^{3+}$ are doped, and citric acid is used as a sintering agent. As shown in FIG. 3, the light-emitting unit 10b emits green light 52 (wavelength: about 495 nm~577 nm) when it is excited by light 60 irradiating on it.

Figure 4:
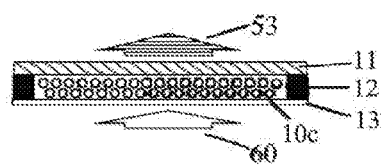
FIG. 4 is a schematic diagram of the light-emitting unit emitting blue light.

The light-emitting unit 10c emitting blue light comprises nanoparticles formed by a third up-conversion material, said third up-conversion material is formed by sintering, wherein NaF is adopted as matrix, $Y^{3+}$, $Yb^{3+}$, and $Tm^{3+}$ are doped, and urea is used as a sintering agent. As shown in FIG. 4, the light-emitting unit 10c emits blue light 53 (wavelength: about 476 nm~495 nm) when it is excited by light 60 irradiating on it.

In this embodiment, as shown in FIG. 1, the display substrate further comprises: a base substrate 11, on which the light-emitting units 10 are formed; a black matrix 12, which is formed on the base substrate 11, and the black matrix 12 separates the light-emitting units 10 from each other; a protective layer 13, which is formed on the light-emitting units 10, and is used for protecting the light-emitting units 10 from structure damage.

Figure 5:
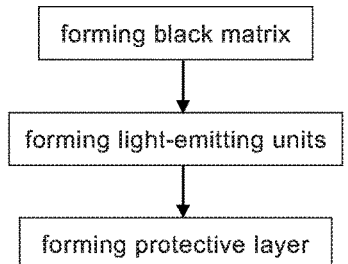
FIG. 5 is a flow chart of preparing the display substrate.

Specifically, when preparing the display substrate 1, as shown in FIG. 5, firstly, the black matrix 12 is formed on the base substrate 11 by photolithography process, and the black matrix 12 are divided into multiple spaces; secondly, corresponding up-conversion nanoparticles are transferred to areas in said spaces by transferring, printing or the like, so that the light-emitting unit 10a emitting red light, the light-emitting unit 10b emitting green light, and the light-emitting unit 10c emitting blue light are formed, wherein one light-emitting unit is formed in one space. Finally, the protective layer 13 is formed on the surface of the light-emitting units 10 by spin coating process or blade coating process.

The display substrate provided by the embodiment of the present invention comprises the light-emitting units 10 made of the up-conversion material, and does not need color filters because color display can be achieved by the light-emitting units 10. Compared to the existing technical solution which achieves color display by color filters, the preparation cost of the display substrate provided by the present invention is lower. Furthermore, since the color display is achieved by self-luminescence, the display substrate displays a wider color gamut and a higher color saturation. Since it does not need color filters to filter light, the light utilization efficiency is higher, thereby power consumption can be reduced. Furthermore, light leakage can be reduced or avoided, too.

Figure 6:
FIG. 6 is a schematic diagram of the display panel provided in an embodiment of the present invention.

The present invention further provides an embodiment of a display panel. FIG. 6 is a schematic diagram of the display panel provided in the embodiment of the present invention. As shown in FIG. 6, in this embodiment, the display panel comprises the display substrates provided by the above embodiment of the present invention.

It should be understood that, the display panel further comprises an array substrate 2 in addition to the display substrate provided by the above embodiment, the array substrate 2 is disposed opposite to the display substrate 1, and a liquid crystal layer 3 is disposed therebetween.

The display panel provided by the embodiment of the present invention adopts the display substrate provided by the above embodiment, so it can reduce cost, display a wider color gamut and a higher color saturation, and can achieve higher light utilization efficiency, thereby can reduce power consumption, and furthermore, can reduce or avoid light leakage.

Figure 7:
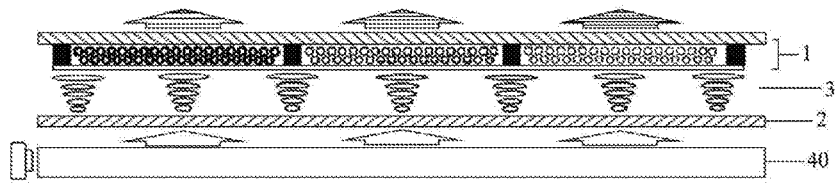
FIG. 7 is a schematic diagram of the display device provided in an embodiment of the present invention.

The present invention further provides an embodiment of a display device. FIG. 7 is a schematic diagram of the display device provided in the embodiment of the present invention. As shown in FIG. 7, in this embodiment, the display device comprises the display panel provided by the above embodiment of the present invention.

Figure 8:
FIG. 8 is a schematic diagram of backlight having a side-entry structure.
Figure 9:
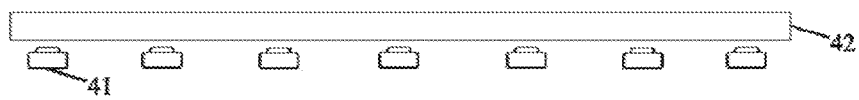
FIG. 9 is a schematic diagram of backlight having a straight down-entry structure.

In this embodiment, the display device comprises backlight 40, which emits light 60 towards the light-emitting units 10, and the light 60 irradiates on the light-emitting units 10 so that the light-emitting units 10 emit light with a corresponding color. As shown in FIG. 8, the backlight 40 comprises a light source 41, a light guide plate 42 and an optical film layer (not shown in the Figure). In FIG. 8, the backlight 40 has a side-entry structure, that is, the light source 41 is disposed on the side of the light guide plate 42. Certainly, in addition to the side-entry structure shown in FIG. 8, the backlight 40 may have a straight down-entry structure, that is, the light source 41 is disposed under the light guide plate 42, as shown in FIG. 9.

Preferably, the backlight is an infrared light source, that is, the light source 41 emits infrared light to irradiate the light-emitting units 10, and the light-emitting units 10 emit light of various colors based on the infrared light irradiated thereon. For example, the light-emitting unit 10a emitting red light emits red light when it is excited by infrared light, the light-emitting unit 10b emitting green light emits green light when it is excited by infrared light, the light-emitting unit 10c emitting blue light emits blue light when it is excited by infrared light. Since infrared light is not visible, observers can not see the light emitted by the backlight 40 at all, and only sees the light emitted by the light-emitting units 10, thereby light leakage can be avoided completely. Meanwhile, infrared light has a longer wavelength, so it has a higher transmittance in the light guide plate 42, optical membrane materials, and structures such as array substrate, liquid crystal layer and so on, which further increases the transmittance of the light in display device, that is, further improves the light utilization efficiency, thereby can reduce the power consumption.

The display device provided by embodiment of the present invention adopts the display panel provided by the above embodiment, so it can reduce cost, display a wider color gamut and a higher color saturation, and can achieve higher light utilization efficiency, thereby can reduce power consumption, and furthermore, can reduce or avoid light leakage.

It should be understood that the above embodiments of the invention have been described only for illustrating the principle of the present invention, but not intended to limit the present invention. The person skilled in the art can make various modifications and variations of the invention without departing from the spirit and scope of the invention, thus the modifications and variations of the invention are also included within the scope of the present invention.

The invention claimed is:

1. A display substrate, comprising multiple kinds of light-emitting units, each of which is only made of an up-conversion material, does not need color filters and is used for emitting light with a corresponding color when a light irradiates on it,
   wherein, said light-emitting units are three kinds of light-emitting units: a light-emitting unit emitting red light, a light-emitting unit emitting green light, and a light-emitting unit emitting blue light,
   said light-emitting unit emitting red light comprises nanoparticles formed by a first up-conversion material, said first up-conversion material is formed by sintering, wherein NaF is adopted as matrix, $Y^{3+}$, $Yb^{3+}$, and $Ce^{3+}$ are doped, and glutamic acid is used as a sintering agent,
   said light-emitting unit emitting green light comprises nanoparticles formed by a second up-conversion material, said second up-conversion material is formed by sintering, wherein NaF is adopted as matrix, $Y^{3+}$, $Yb^{3+}$, and $Ho^{3+}$ are doped, and citric acid is used as a sintering agent, and
   said light-emitting unit emitting blue light comprises nanoparticles formed by a third up-conversion material, said third up-conversion material is formed by sintering, wherein NaF is adopted as matrix, $Y^{3+}$, $Yb^{3+}$, and $Tm^{3+}$ are doped, and urea is used as a sintering agent.

2. The display substrate according to claim 1, wherein, said light is infrared light.

3. The display substrate according to claim 1, wherein, said display substrate further comprises:
   a base substrate, on which said light-emitting units are formed;
   a black matrix, which is formed on said base substrate, and separates said light-emitting units from each other; and
   a protective layer, which is formed on said light-emitting units.

4. The display substrate according to claim 2, wherein, said display substrate further comprises:
   a base substrate, on which said light-emitting units are formed;
   a black matrix, which is formed on said base substrate, and separates said light-emitting units from each other; and
   a protective layer, which is formed on said light-emitting units.

5. A display panel, comprising the display substrate according to claim 1.

6. A display device, comprising the display panel according to claim 5.

7. The display device according to claim 6, wherein, said display device comprises backlight, which emits light towards the light-emitting units, such that the light irradiates on the light-emitting units and the light-emitting units emit light with corresponding colors.

8. The display device according to claim 7, wherein, said backlight includes an infrared light source.

* * * * *